United States Patent [19]

Awerbuch

[11] 4,152,898
[45] May 8, 1979

[54] ENERGY TRANSFER APPARATUS AND METHOD USING GEOTHERMAL BRINE

[75] Inventor: Leon Awerbuch, Tel Aviv, Israel

[73] Assignee: Bechtel International Corporation, San Francisco, Calif.

[21] Appl. No.: 820,983

[22] Filed: Aug. 1, 1977

[51] Int. Cl.² ............................................... F03G 7/00
[52] U.S. Cl. ........................................ 60/641; 60/648; 203/DIG. 20
[58] Field of Search ............................... 60/641, 648; 203/DIG. 20

[56] References Cited

U.S. PATENT DOCUMENTS 3,972,193  8/1976  Sherwood ............................... 60/670

*Primary Examiner*—Allen M. Ostrager
*Attorney, Agent, or Firm*—Townsend and Townsend

[57] ABSTRACT

A multi-effect system for using the heat, water and solids content of geothermal brine to produce useful work, fresh product water and inorganic salts. A flash separator receives brine from a geothermal well and provides the initial steam forming the heat source for the brine flowing through a first effect of the system. The system has a number of effects in series with each effect having means for generating steam from the brine flowing through it, and using the generated steam to provide the heat source for the next adjacent effect. Steam from each effect is also moved in heat exchange relationship to a binary fluid in a closed loop containing a gas turbine so that the binary fluid can be heated sufficiently to drive the turbine, the latter, in turn, being coupled to a work-producing apparatus, such as a generator. In one form of the invention, the steam to heat the binary fluid is the uncondensed part of the steam used as a heat source for each effect. In another form of the invention, this steam is part of the steam generated in each effect. Condensate formed in each effect from the steam received thereby is transferred to the next adjacent effect and, from the last effect, the condensate is drawn off as fresh product water. Brine blowdown removed from one or more of the effects provides the source of inorganic salts. As disclosed herein, the effects are vertical tube evaporators.

22 Claims, 4 Drawing Figures

ENERGY TRANSFER APPARATUS AND METHOD USING GEOTHERMAL BRINE

This invention relates to improvements in energy conversion techniques and, more particularly, to apparatus and method for more efficiently using the heat energy of geothermal brine to produce useful work, fresh water and inorganic salts.

BACKGROUND OF THE INVENTION

To extract the heat energy and water content of geothermal brine in an efficient manner, a system of elements is required which safely handles the brine even though it is at extremely high temperatures and pressures yet it allows substantially continuous operation to provide for substantial continuous work output. Attempts have been made in the past to provide a system which operates to achieve this aim; however, the attempts have not been completely satisfactory for one reason or anoher, primarily due to the inefficiencies resulting from the designs of the systems themselves. Typical of geothermal systems of the prior art are those disclosed in the following U.S. Pats. Nos.: 3,605,403; 3,757,516; 3,845,627; 3,893,299; and 3,953,972; the latter patent also listing additional U.S. Patents in this field.

Because of the deficiencies of the prior art systems, a need has arisen for an improved system for handling geothermal brine to achieve the foregoing aims.

SUMMARY OF THE INVENTION

The present invention is directed to an improved apparatus and method for handling geothermal brine to satisfy the aforesaid need. Such apparatus and method includes a multi-effect system which handles geothermal steam and brine in a manner which efficiently provides heat energy for heating a binary fluid flowing through a closed loop containing a gas turbine and for producing fresh product water and inorganic salts so that the geothermal brine itself from a well is processed in a manner to derive the maximum benefit from its heat, water and solids contents.

The effects of this invention can be vertical tube evaporators, horizontal tube evaporators, long tube evaporators, a multi-effect slurry system or the like. In one form of the invention, the steam for heating the binary fluid is the uncondensed part of the steam directed to each effect source. In another form of the invention, this steam is a part of the steam generated in each effect.

In both embodiments, brine entering each effect flashes to provide a first mass of steam or vapor. Then the brine passes in heat exchange relationship to steam from a source outside the effect to generate additional steam to be mixed with the flashed steam or vapor as well as to increase the concentration of the brine flowing through the apparatus. The steam from outside the effect, when it gives up its heat as herein described, condenses on a heat transfer surface to yield a product of pure distilled water. Steam generated in this manner becomes the heat source for the next effect.

By concentrating the brine flowing through the apparatus, crystallization of valuable constituents from the brine can be derived with a minimum expenditure of energy and in equipment of minimal size for a given output of the constituents. Thus, at the downstream end of the apparatus, fresh product water can be drawn off as well as inorganic salts which can be further processed for use as desired or needed.

The closed loop containing the binary fluid and the turbine also includes a condenser for condensing the exhausted turbine gases. This condenser can take several forms, including a condenser having a spray head supplied by a cooling tower.

The method of the present invention includes directing geothermal steam into heat exchange relationship to geothermal brine at a number of spaced locations to heat the brine to cause steam to be generated from the water content thereof, and then using a part of such generated steam from each location as the source of heat for heating and vaporizing brine at the next adjacent location while collecting the condensate developed at the various locations so that the condensate can be used as fresh product water. The method further includes the step of using another part of the steam generated from the brine at each station for heating a binary fluid flowing in a closed path and operable to produce work as a function of its flow along the path.

Scale formation will be limited to pipes which can easily be cleaned. The teachings of the present invention assure that scale formation does not occur in the turbine.

The primary object of this invention is to provide an improved apparatus and method for handling geothermal brine and steam in a manner to efficiently produce useful work, fresh product water and inorganic salts, yet the apparatus can be used and the method carried out in a substantial continuous manner without presenting safety hazards for operating personnel.

Another object of this invention is to provide apparatus and a method of the type described wherein the apparatus includes a multi-effect system in which steam is generated as a function of the flow of geothermal brine through the effects so that the steam can be used not only to heat a binary fluid flowing in a work-producing subsystem but can also be used as a heat source for the next adjacent effect and also to serve as the source of fresh product water which can be drawn off from the system at the downstream end thereof with reference to the flow of brine therethrough.

Other objects of this invention will become apparent as the following specification progresses, reference being had to the accompanying drawings for illustrations of several embodiments of the invention.

Figure 1:
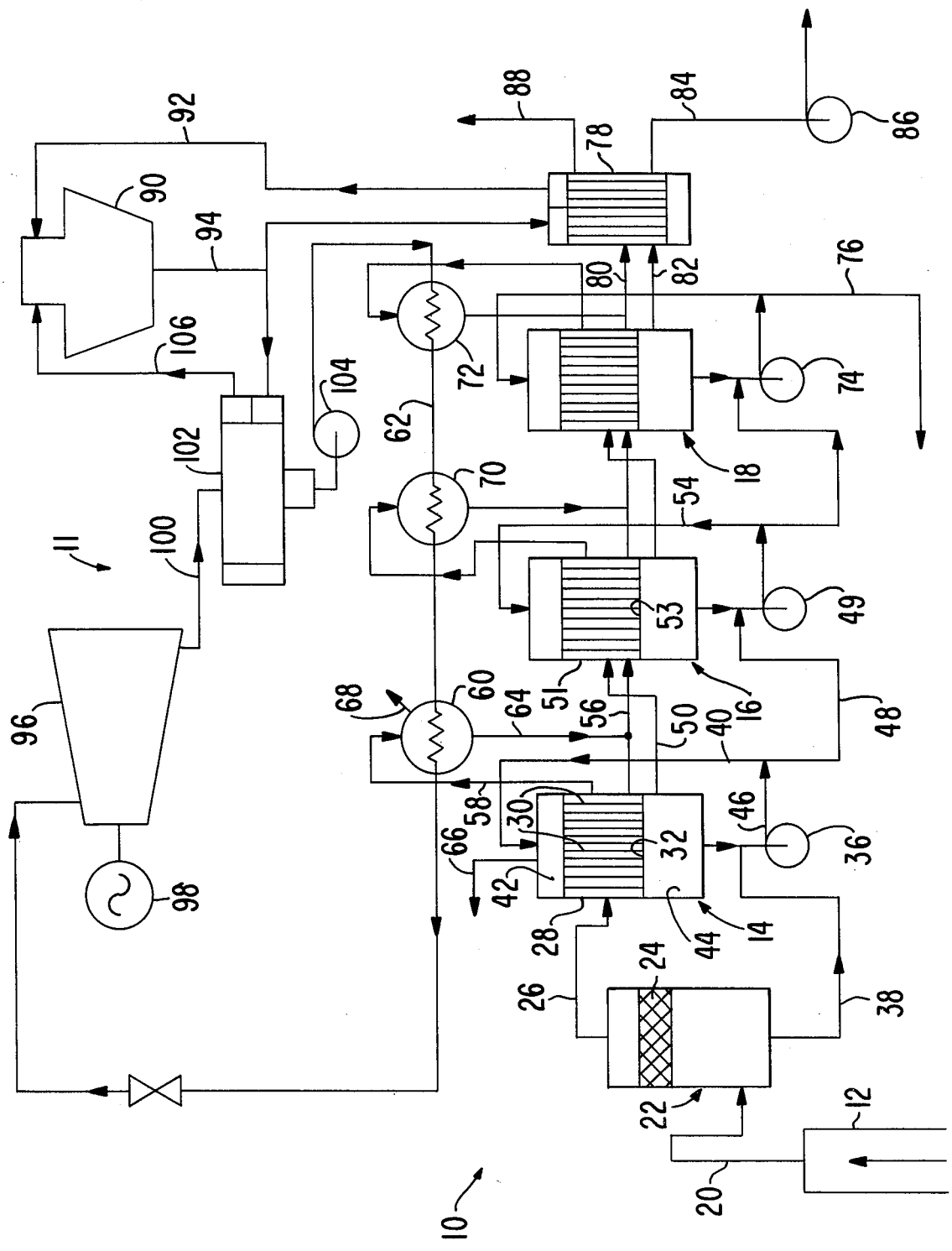
FIG. 1 is a schematic view of a multi-effect geothermal power-desalination system using effects in the form of vertical tube evaporators.

The first embodiment of the multi-effect system is shown in FIG. 1 and is broadly denoted by the numeral 10. System 10 is adapted to be coupled to the outlet of a geothermal well 12 from which geothermal brine issues. The brine is processed to utilize the heat energy thereof to produce useful work in a subsystem 11 and is further processed to produce distilled water and inorganic salts by a desalination process, all of which are hereinafter described.

System 10 includes a number of effects which, for purposes of illustration are three in number. There can be more or fewer effects if desired. Each effect is of the vertical tube evaporator type and is shown in detail in FIG. 2. The effects are arranged in series relationship and are denoted by the numerals 14, 16 and 18. While vertical tube evaporators are shown in the drawings and will be described hereinafter, it is to be understood that other types of effects are applicable in carrying out the teachings of this invention, such as horizontal tube evaporators, long tube evaporators, a multi-effect slurry system and the like.

Brine leaving well 12 along line 20 is directed into a flash separator 22 where it is flashed to produce steam or vapor which passes through a demister 24 and then through a line 26 to the inlet of the steam chest 28 of effect 14. The steam entering the steam chest is applied to and condenses on the outer surfaces of the vertical tubes 30 of effect 14, the condensate gravitating onto a surface 32 and being denoted by the numeral 34 (FIG. 2) near the lower ends of tubes 30. The steam, when applied to tubes 30, serves as a source of heat for heating brine flowing through the tubes as hereinafter described.

Brine which has been flashed in separator 22 is drawn by a pump 36 along line 38 to a line 40 which is coupled with the upper plenum chamber 42 of effect 14, the brine then falling through plenum 42 and into and through tubes 30 as a film on the inner surfaces of such tubes. Upon entering plenum 42, the brine flashes to form steam or vapor before entering tubes 30. This flashed vapor travels with the brine into and through tubes 30.

A portion of the water content of the brine in tubes 30 is vaporized by the heat energy supplied by the steam from line 26 applied to the outer surfaces of tubes 30. The vapor generated in plenum 42 and in tubes 30 and the residual, unvaporized brine flow into a sump 44 at the lower end of effect 14. This residual brine is discharged from sump 44 along a line 46 to line 38. A portion of the discharged residual brine from sump 44 is circulated along line 40 by pump 36 to plenum 42. The remainder of the residual brine leaves by way of line 48 to the pump 49 (FIG. 1) of effect 16, pump 49 having the same function as pump 36 of effect 14.

The steam or vapor in sump 44 of effect 14 leaves the sump by way of line 50 and a portion enters the steam chest 51 of effect 16. This vapor serves as a source of heat energy applied to the outer surfaces of the vertical tubes of the effect 16 for vaporizing some of the water content of the brine passing through such tubes, the brine being directed by pump 49 along line 54 to the upper plenum chamber of effect 16 in the manner described above with respect to the brine flow into plenum 42 of effect 14. The steam in steam chest 51 condenses on the outer surfaces of the corresponding vertical tubes and is collected on surface 53 near their lower ends.

Condensate 34 (FIG. 2) leaves steam chest 28 of effect 14 along a line 56 and this condensate flows into steam chest 51 of effect 16. On entering this second steam chest, the condensate flashes and the steam thus generated gives up a portion of its heat content to the brine flowing through the tubes of effect 16.

The portion of the geothermal steam not condensed in steam chest 28 of effect 14, together with hot, non-condensible gases, is sent by line 58 to a heat exchanger 60. This steam or vapor is condensed in heat exchanger 60 and transfers its heat energy to a binary fluid passing through the heat exchanger along a line 62 forming a part of a closed loop in subsystem 11. Condensate from heat exchanger 60 flows along line 64 and enters line 56 for flow through the steam chest 51 of effect 16.

Figure 2:
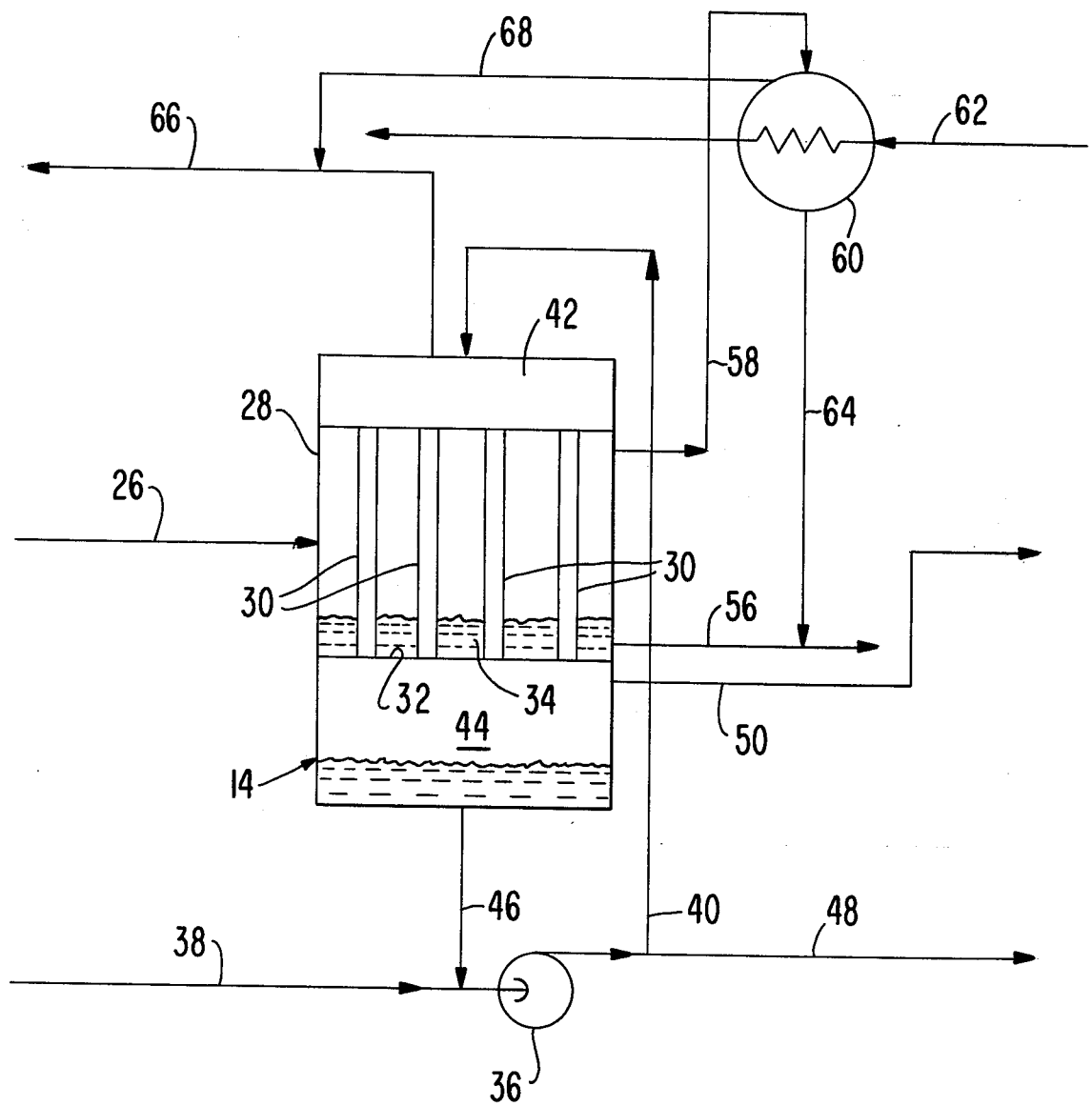
FIG. 2 is an enlarged schematic view of one of the effects of the system of FIG. 1.

The vaporizing action in each of effects 14, 16 and 18 is improved by the use of a partial vacuum which evacuates each effect by way of line 66 (FIG. 2). This partial vacuum can be created by a steam ejector or by a vacuum pump (not shown). Also, the vacuum system removes, by way of line 68 (FIG. 2), the non-condensible gases in the corresponding heat exchanger, such as heat exchanger 60 of FIG. 2.

The operation and purpose of effects 16 and 18 are the same as those of effect 14 as described above, it being understood that effect 16 operates at a lower temperature and pressure than effect 14, and effect 18 operates at a lower temperature and pressure than effect 16. Thus, brine entering the upper plenum of each effect flashes to form steam or vapor which travels with the brine through the vertical tubes of the corresponding effect toward the sump of the effect.

A heat exchanger 70 similar in all respects to heat exchanger 60 is associated with effect 16, and a heat exchanger 72 similar to heat exchangers 60 and 70 is associated with effect 18. A pump 74 of effect 18 performs the same function as pumps 36 and 49 of effects 14 and 16, respectively. A line 76 at the outlet of pump 74 provides a blowdown of residual brine for the recovery of inorganic salts. Salts can also be recovered from effects 14 and 16.

A final condenser 78 is located downstream of effect 18 and is coupled by a line 80 to the steam chest of effect 18 to receive condensate therefrom and by a line 82 to the sump of effect 18 for receiving vapor therefrom. Condenser 78 condenses the vapor and mixes it with the condensate from line 80, and the resulting condensate is directed along a line 84 by a pump 86 as fresh product water to a tank or other collection means. A line 88 vents condenser 78 to the vacuum system mentioned above. Cooling water for condenser 78 is supplied by a cooling tower 90 by way of lines 92 and 94.

Subsystem 11 (FIG. 1) includes a turbine 96 coupled to a generator 98 or other work-producing apparatus for driving the same. Binary fluid flowing along line 62 enters turbine 96 for actuating the same. A line 100 directs exhausted vapor from the turbine to a power condenser 102 which condenses the binary fluid and returns it to line 62 by way of a pump 104. Heat rejected in power condenser 102 is removed by the fluid flow through cooling tower 90, along lines 94 and 106.

The binary power fluid can be, for example, of any typical organic fluid, such as isobutane, anhydrous ammonia or any compound of the Freon family. Water may also be used so as to allow the use of a conventional steam turbine. The selection of the binary fluid and type of turbine will depend upon the thermodynamic properties of the geothermal field from which the brine issues. The use of expanders and total flow turbines is possible with system 10.

As described above, to provide the vapor necessary to preheat the binary fluid in line 62, vapor is removed from the steam chests of effects 14, 16 and 18, such as by the use of line 58 (FIG. 2) of effect 14. This provides positive venting of the steam chest. This is to be contrasted to the modification of the system shown in FIG. 3 in which a portion of the vapor from the sump of each of effects 14, 16 and 18 is directed to the corresponding preheater in line 62. For instance, line 50 leaving sump 44 of effect 14 has a branch 50a which passes to a steam chest of effect 16 and a line 50b leading to the inlet side of preheater 60.

Figure 3:
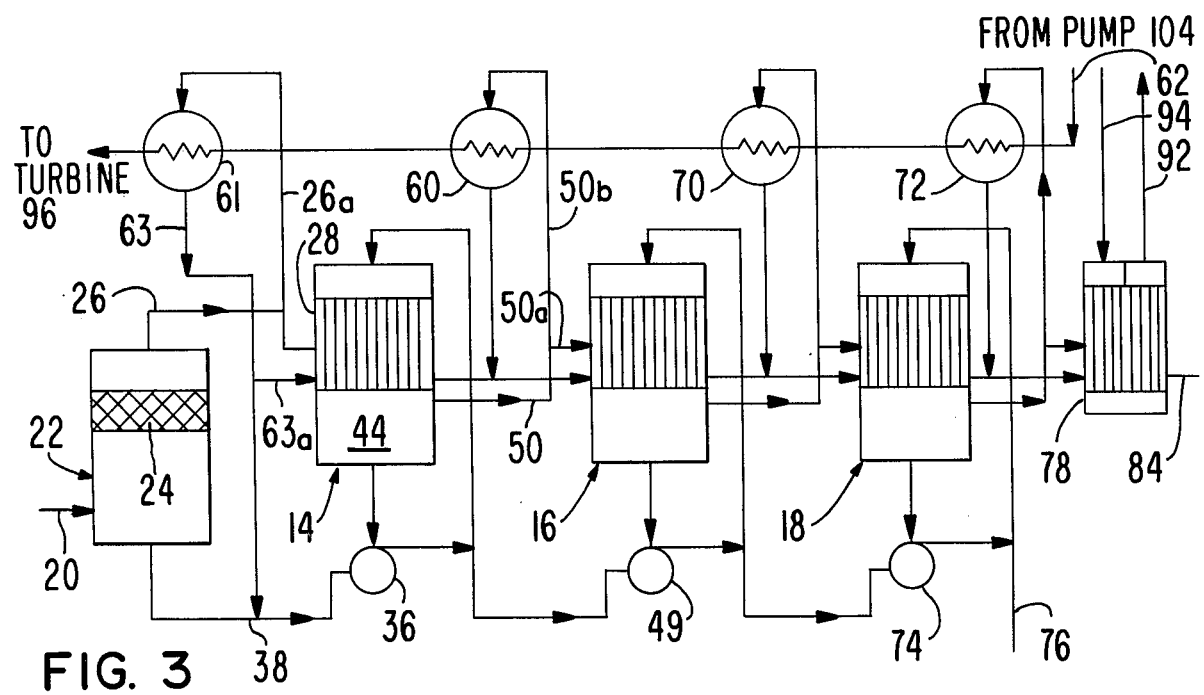
FIG. 3 is a view similar to FIG. 1 but showing a portion of a second embodiment of the system.

FIG. 3 also shows a superheater or additional heat exchanger 61 coupled with line 62 and provided with steam or vapor along a branch 26a of line 26. The condensate from superheater 61 is directed along a line 63 to line 38 at the sump side of flash separator 22. A branch line 63a directs a portion of the condensate from superheater 61 to steam chest 28 of effect 14. Except for the foregoing differences, the system of FIG. 3 is essentially the same in construction and function as system 10 of FIG. 1.

Figure 4:
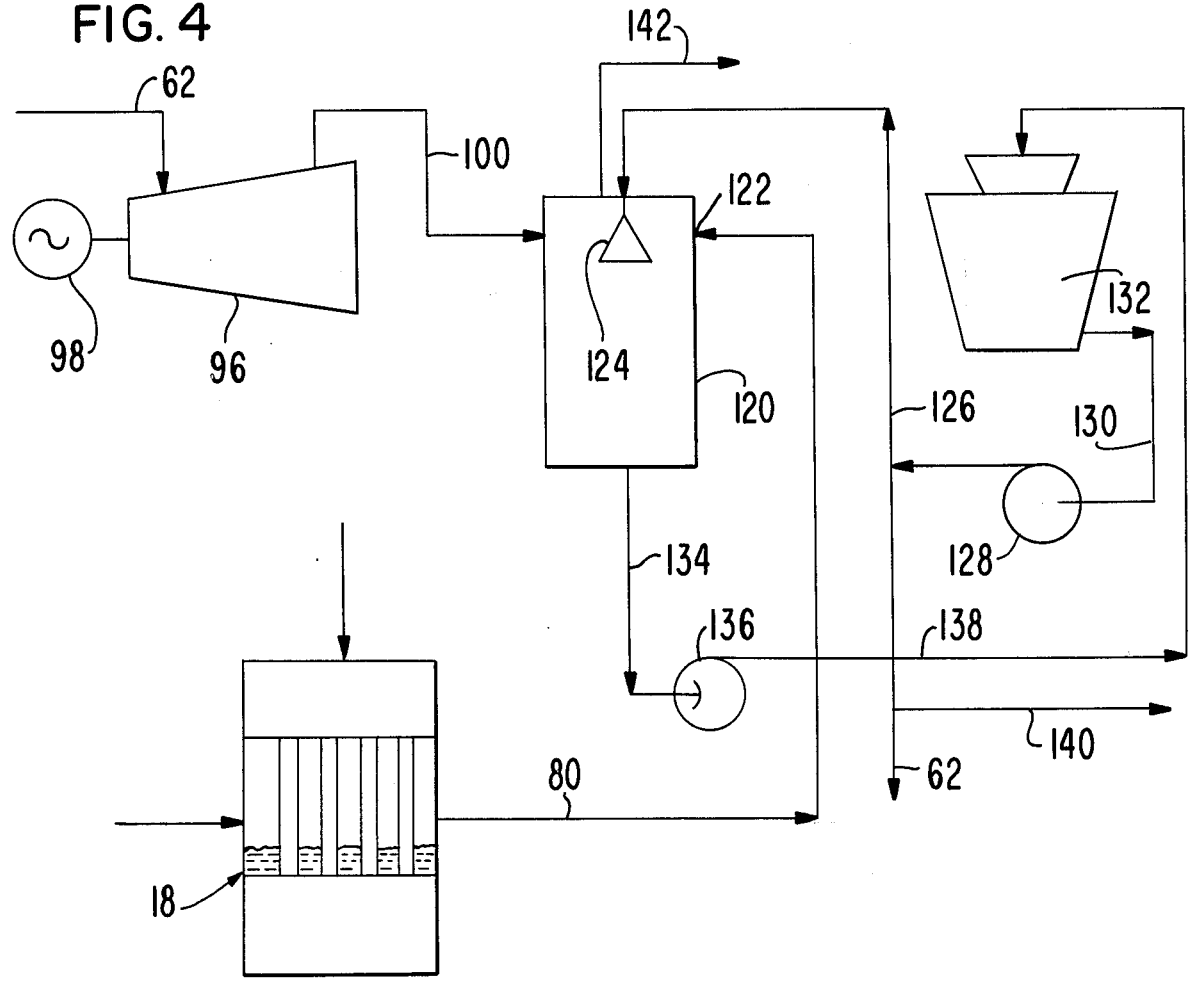
FIG. 4 is a schematic view of a third embodiment of the system.

If water is the binary fluid for operating the turbine, the vapor outlet of effect 18, instead of being coupled with final condenser 78 is coupled to a direct contact condenser 120 as shown in FIG. 4. To this end, line 80 is coupled to an inlet 122 of condenser 120, the latter having a spray nozzle 124 which is supplied by a line 126 from a pump 128 coupled to the outlet line 130 of a cooling tower 132, the latter being supplied with condensate from condenser 120 by way of line 134, pump 136 and line 138. Exhausted steam from turbine 96 is directed by line 100 into condenser 120 and moves into direct contact with the spray from nozzle 124. A portion of the cooled water from cooling tower 132 is directed into line 62 to form a closed loop with turbine 96 and condenser 120. Another line 140 directs the remainder of the cooled water from cooling tower 132 to a collection means as fresh product water, suitable for numerous uses where purified water is required. Non-condensible gases are withdrawn from condenser 120 along a line 142 by way of a vacuum system (not shown). If water is the binary power fluid, then the heat exchangers 60, similar to the heat exchangers 70 and 72, are the direct contact condensers operating similarly to the condenser 120 mentioned above. Additional water in the subsystem 11 is directed by pump 86 into line 62.

I claim:

1. Apparatus for converting the heat and water content of geothermal brine into useful work and fresh product water comprising: a multi-effect system adapted to be located adjacent to a geothermal well; means at one end of the system for connecting the latter to said geothermal well, said connecting means being operable to provide steam and brine for the first effect of the system, each effect having first means for receiving geothermal brine and second means for receiving steam, said second means in each effect being in heat exchange relationship to the corresponding first means to cause the steam to heat the brine received by the effect to permit the production of additional steam in the effect; means coupled to each pair of adjacent effects, respectively, for pumping brine from one effect to the other effect; means coupled to each pair of adjacent effects, respectively, for directing a part of the steam generated in one effect to the other effect for heating brine flowing through said other effect; a subsystem including a closed loop containing a binary fluid and a turbine; means coupled with each effect, respectively, for placing a part of the steam generated therein in heat exchange relationship to the binary fluid flowing in said closed path to heat the fluid sufficiently to drive the turbine and thereby allow the production of useful work; and means coupled with the system near the other end thereof for receiving condensate for use as fresh product water.

2. Apparatus as set forth in claim 1, wherein each effect is a vertical tube evaporator.

3. Apparatus as set forth in claim 1, wherein each effect is a horizontal spray film evaporator.

4. Apparatus as set forth in claim 1, wherein each effect is a multi-stage flash evaporator section.

5. Apparatus as set forth in claim 1, wherein said connecting means includes a flash separator.

6. Apparatus as set forth in claim 1, wherein is provided a condenser, the last effect of the system being coupled to the condenser for directing steam and condensate thereto, and means coupled with the condenser for supplying a coolant thereto.

7. Apparatus as set forth in claim 1, wherein the subsystem includes a number of heat exchangers in series relationship through which the binary fluid passes, each effect being coupled to a respective heat exchanger for supplying steam thereto.

8. Apparatus as set forth in claim 1, wherein each effect has a steam chest for receiving steam and means in the steam chest for permitting brine to flow in heat exchange relationship to the steam received thereby.

9. Apparatus as set forth in claim 8, wherein is provided means connected to the steam chest of each pair of adjacent effects, respectively, for transferring condensate from the steam chest of one effect to the steam chest of the other effect.

10. Apparatus as set forth in claim 9, wherein said placing means of each effect is in fluid communication with the transferring means to direct condensate thereto.

11. Apparatus as set forth in claim 1, wherein at least one of the effects of the series includes means for removing inorganic salts therefrom.

12. Apparatus for converting the heat, water and solids content of geothermal brine into useful work, fresh product water and inorganic salts comprising: a multi-effect system adapted to be located adjacent to a geothermal well, said system including a number of vertical tube evaporators defining the effects for the system, each effect having a steam chest, a plurality of vertical tubes in the steam chest, a plenum communicating with the entrance ends of the vertical tubes, and a sump communicating with the exit ends of the vertical tubes; a flash separator adapted to be coupled to a geothermal well and coupled to the first effect of the system for supplying steam to the steam chest thereof, the flash separator having means coupling the same to the plenum of the first effect for supplying brine thereto for flow into the plenum and through the corresponding vertical tubes to the corresponding sump; means coupled with the sump of each effect for directing brine therefrom to the plenum of the next adjacent effect; means coupling the sump of each effect to the steam chest of the next adjacent effect to supply steam to the latter for heating the brine flowing through the vertical tubes thereof; means placing the steam chest of each pair of adjacent effects in fluid communication with each other to permit transfer of condensate from one effect to the other effect; a subsystem comprising a closed loop defining a fluid passage and a gas turbine for receiving the fluid flowing through the loop, there being a heat exchanger in the loop for each effect, respectively; means coupling the sump of each effect to the corresponding heat exchanger for directing steam thereto, whereby the steam will impart heat energy to the fluid flowing therethrough, the condensate from each heat exchanger being directed to the steam chest of the next effect, the subsystem having means for condensing the exhausted fluid from the turbine and for circulating the fluid through the loop; means coupled with the last effect of the system for condensing the steam therefrom and mixing it with the condensate of the system, whereby the steam-condensate mixture can be drawn from the system as fresh product water; and means coupled with at least one of the effects for directing the residual solids from the sump thereof to a collection station for use as inorganic salts.

13. A method of handling geothermal brine comprising: moving geothermal brine along a first path from a geothermal well; flashing the brine at a first station along said first path to form steam; moving the brine from the first station through a series of other stations at spaced locations along the path; moving the steam generated at the first station into heat exchange relationship with the brine passing through the second station to generate steam at the second station and to cause the incoming steam to the second station to form a condensate; directing a first portion of the steam generated at the second station into heat exchange relationship with the brine flowing through the third station to generate steam at the same; repeating the moving and directing steps for all stations after the second station; directing a second portion of the steam generated at each station into heat exchange relationship with a binary fluid flowing through a second path; producing useful work as a function of the flow of binary fluid along said second path; and removing the condensate from each station and collecting the same for use as fresh product water.

14. A method as set forth in claim 13, wherein the directing step includes forming a condensate after the steam moves into heat exchange relationship to the binary fluid, and transferring the condensate to the next adjacent station.

15. A method as set forth in claim 13, wherein the moving step includes moving the brine along a plurality of generally parallel passages at each station.

16. A method as set forth in claim 15, wherein the passage is generally vertical.

17. A method as set forth in claim 13, wherein is included the step of removing solids from the stations along said first path for use as inorganic salts and to achieve a variety of inorganic products.

18. A method as set forth in claim 13, wherein is included the step of flashing the brine as it passes through the second and subsequent stations.

19. A method as set forth in claim 18, wherein is included the step of applying a partial vacuum to each of the second and subsequent stations to enhance the flashing of the brine therein.

20. A method as set forth in claim 13, wherein is included the step of condensing the fluid in said second path, and pumping the condensed fluid along the second path.

21. A method as set forth in claim 20, wherein said condensing step includes spraying water on said fluid.

22. A method as set forth in claim 21, wherein is included the step of directing steam from the last station into said spray of water.

* * * * *